United States Patent
Bosworth, Sr.

(10) Patent No.: US 7,506,756 B2
(45) Date of Patent: *Mar. 24, 2009

(54) CONTAINER LID WITH DISC SHAPED MEDIA AND METHOD OF USE

(75) Inventor: John O. Bosworth, Sr., 601 N. Broadway, Upper Nyack, NY (US) 10960

(73) Assignees: John O. Bosworth, Sr., Upper Nyack, NY (US); The GARR Group, L.L.C., Vorhees, NJ (US)

( * ) Notice: Subject to any disclaimer, the term of this patent is extended or adjusted under 35 U.S.C. 154(b) by 65 days.

This patent is subject to a terminal disclaimer.

(21) Appl. No.: 10/878,279

(22) Filed: Jun. 28, 2004
(Under 37 CFR 1.47)

(65) Prior Publication Data
US 2007/0062943 A1    Mar. 22, 2007

(51) Int. Cl.
*B65D 85/57* (2006.01)

(52) U.S. Cl. .................. 206/308.1; 206/217; 206/303; 206/493

(58) Field of Classification Search .............. 206/308.1, 206/303, 308.2, 485.1, 232, 493, 217; 220/694, 220/212, 521, 713, 245.1, 217, 709, 522, 220/711, 255; 215/229, 388
See application file for complete search history.

(56) References Cited

U.S. PATENT DOCUMENTS

| 3,048,317 | A  | * | 8/1962 | Cochrane et al. | ......... 229/103.1 |
| 5,531,347 | A  |   | 7/1996 | Goulding |  |
| 5,542,532 | A  |   | 8/1996 | Mitchell |  |
| 6,070,752 | A  | * | 6/2000 | Nava et al. | .................. 220/521 |
| 6,112,891 | A  |   | 9/2000 | Wohl et al. |  |
| 6,364,102 | B1 | * | 4/2002 | Gordon et al. | .............. 206/217 |
| 6,454,087 | B2 | * | 9/2002 | Gordon et al. | .............. 206/217 |
| 6,557,698 | B2 | * | 5/2003 | Gordon et al. | .............. 206/217 |
| 6,675,960 | B2 |   | 1/2004 | Innis |  |
| 2005/0167294 | A1 | * | 8/2005 | Swayne | ...................... 206/217 |

\* cited by examiner

*Primary Examiner*—Mickey Yu
*Assistant Examiner*—Steven A. Reynolds
(74) *Attorney, Agent, or Firm*—Watov & Kipnes, P.C.

(57) ABSTRACT

A container lid for a cup-type beverage which includes within the lid a disc-shaped media in which the lid is adapted to be releasably affixed to the beverage container and where the lid is protected from the beverage within the container and wherein the disc may be removed from the lid and utilized for entertainment purposes.

8 Claims, 3 Drawing Sheets

CONTAINER LID WITH DISC SHAPED MEDIA AND METHOD OF USE

BACKGROUND OF THE INVENTION

1. Field of the Invention

This invention relates, in general, to a device for packaging and displaying a circular or disc-shaped media and a method for packaging such disc-shaped media and to container lids generally and more particularly, but not by way of limitation to a novel container lid having, a media disc disposed herein and a method of use of the lid.

Still more particularly, the present invention relates to a new and improved container for initially packaging and thereafter repeated storing of disc-shaped media.

2. Description of the Related Art

Media discs disposed in beverage cup lids have become an increasingly popular method of, for example, advertising or offering premiums to buyers of the beverage. Such beverages may, for example, be coffee, soft drinks, or soup. The media disc can be a miniature CD or DVD disc. The patron purchases a drink in the cup and retrieves the media disc from the lid thereof. The media disc can then be played on portable equipment and/or taken to the patron's home, vehicle or work place for later playing.

Problems however arise with the closures that have been provided with compartments, particularly when the closures are used for drink cups or other containers containing beverages. Typically, the closure is configured with a opening, such as a pair of crisscrossed slits, for receiving a straw. When a straw is inserted through the slits, liquid can seep through the slits and into the compartment thereby damaging the contents therein, perhaps rendering the contents unusable. Indeed, seepage through the slits is virtually inevitable if the portion of the closure in which the slits is formed is disposed near the level of the beverage. In such a case, downward displacement of the closure as a result of the initial insertion of the straw through the slits typically submerges the slits within the beverage causing substantial seepage through the slits.

In cases where the closure compartment is at or below the level of the cup lip, the volume of this compartment actually displaces the interior volume of the cup and thus upon attachment of the closure would cause substantial spillage in a fully filled beverage. Moreover, customers at quick service restaurants and the like usually prefer beverages to be filled to the brim. With the beverage filled to the brim, substantial seepage or spillage can occur upon insertion of the straw or attachment of the closure itself causing considerable annoyance to the customer and extra work for the restaurant staff mopping up the spilled beverages. To avoid this problem, beverage cups are often filled only to a specified level well below the brim of the cup. In restaurants where the cup is automatically filled, automatic filling devices therefore need to be properly set and monitored to ensure that the beverage does not exceed the specified level. If the cup is manually filled by the staff, the staff therefore needs to constantly remember to fill the cup only to the specified level. Furthermore, in many quick service restaurants, the customers fill their own beverage cups, thereby permitting re-fills by the customer. The customers are often not aware that filling the cup to the brim will cause subsequent spillage and, hence, the customers typically overfill the cups resulting in frequent and substantial spillage, in the vicinity of the beverage dispensers.

In general, a substantial risk of seepage or spillage occurs if either the criss-crossed slits of the closure or the compartment itself are positioned such that, when the closure is mounted to the drink container, the slits or the bottom of the compartment are positioned at or below the top perimeter edge of the drink container. Unfortunately, prior art compartment closures for drink containers are typically configured to position both the criss-crossed slits and the bottom of the compartment well below the top perimeter edge of the drink container. These prior art beverage lids have leakage into the compartment.

U.S. Pat. No. 6,070,752 to Nava, et al. addressed the leakage problem by raising the straw entry openings, by providing a raised portion within which the criss-crossed slits are formed, the slits are thereby disposed, in use, well above the level of any liquid within the drink container such that, even with a straw inserted through the slits, it is highly unlikely during normal use of the cup that any liquid from within the cup will pass through the slits and into the compartment. Hence contents within the compartment are substantially protected from contamination by the liquid even if the cup is initially filled to the brim and even if significant downward displacement of the closure occurs upon insertion of the straw. This results in a lid that rises high above the beverage.

It would be desirable to provide a merchandise container closure, particularly a closure for use with drink containers, with a compartment wherein the closure is configured to avoid the aforementioned problems without rising high above the beverage and it is to that end that the invention is primarily directed.

Known such beverage lids suffer from a number of disadvantages. Many are bulky and can't be loaded automatically. The ones that are taken off a roll are easily stolen. Sealing with RF or adhesives to prevent leakage is expensive and often unattractive.

The present invention provides a beverage cup lid and method of use that require no adhesive. RF sealing, or like means of attachment and/or sealing.

The present invention provides a beverage cup lid with a media disc disposed therein that can have the elements thereof mechanically attached.

The present invention further provides such a beverage cup lid that can be assembled with high-speed equipment.

The present invention further provides such a beverage lid with a media disc disposed therein that seals the media disc from the contents of the beverage cup and is attractive.

The present invention further provides such a beverage lid with a media disc disposed therein that seals the media disc from the contents of the beverage cup and is not held high above the cup and beverage.

The present invention yet further provides such a beverage cup lid that can be handled without it coming apart.

Other properties of the present invention, as well as particular features, elements, and advantages thereof, will be elucidated in, or be apparent from, the following description and the accompanying drawing figures.

BRIEF DESCRIPTION OF THE DRAWINGS

Understanding of the present invention and the various aspects thereof will be facilitated by reference to the accompanying drawing Figures, which are provided for purposes of illustration only and not intended to define the scope of the invention, in which.

DETAILED DESCRIPTION OF THE PREFERRED EMBODIMENTS

Figure 1:
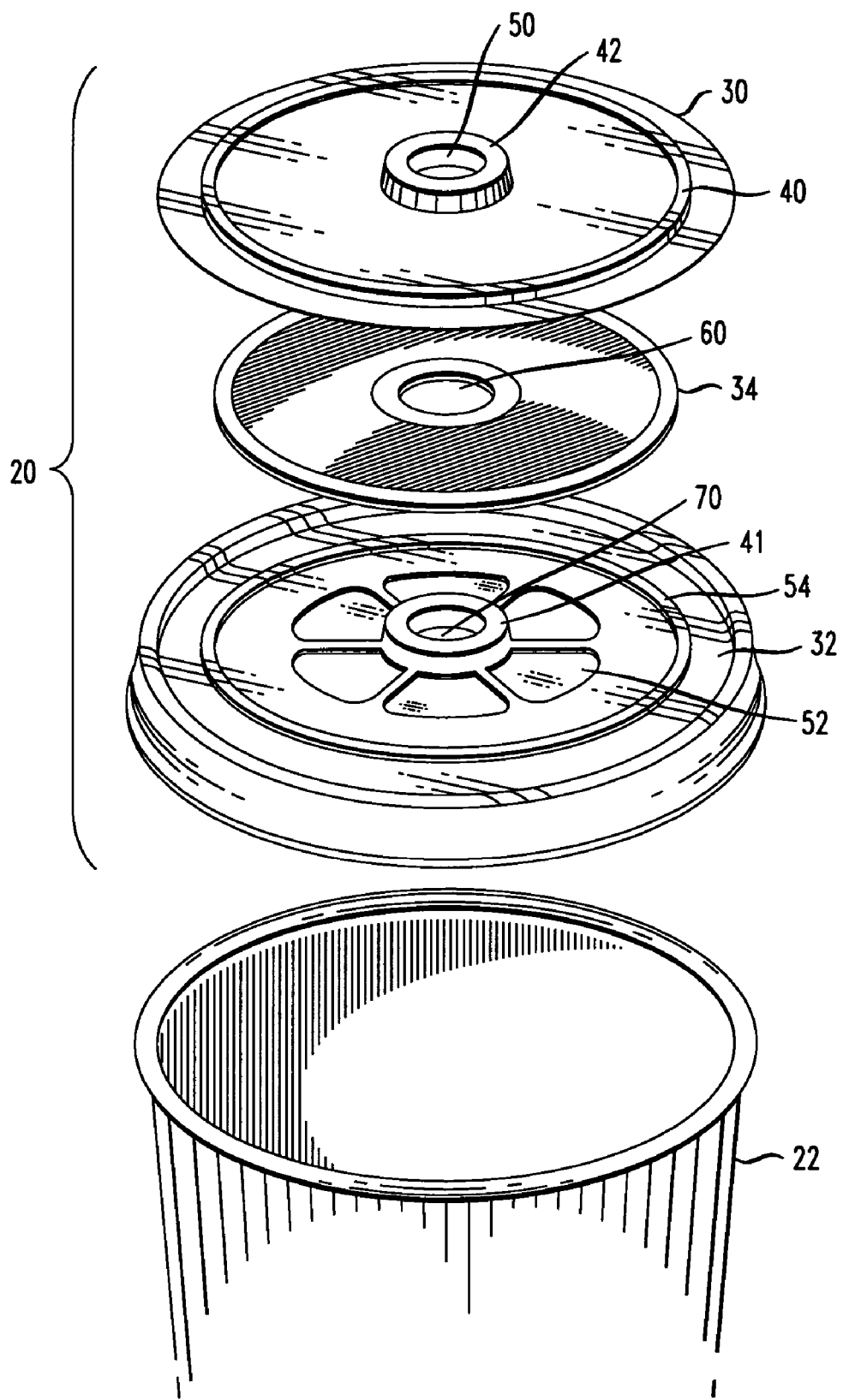
FIG. 1 is an exploded top isometric view of the container lid of the present invention shown with the upper portion of a container.

Reference should now be made to the drawing. Figures on which similar or identical elements are given consistent identifying numerals throughout the various Figures thereof, and on which parenthetical references to Figure numbers, when used, direct the reader to the view(s) on which the element(s) being described is (are) best seen, although the element(s) may be seen on other Figures also.

Figure 2:
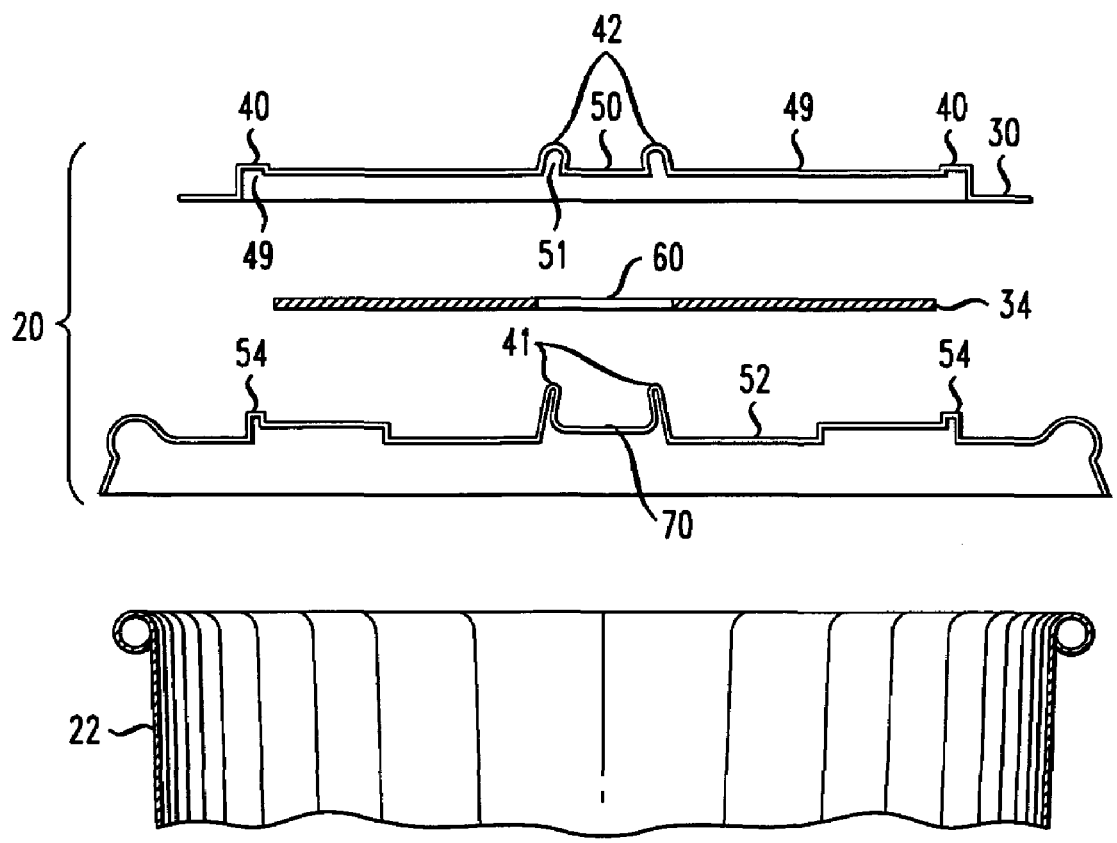
FIG. 2 is an exploded side elevational view of the elements of FIG. 1.

FIGS. 1 and 2 illustrate a container cup lid, generally indicated by the reference numeral 20, disposed over an open-top container cup 22. Container cup lid 20 includes a generally planar top 30, the upper element and a generally planar bottom 32, the lower element with a generally planar disc-shaped media 34 disposed therebetween. A pair of concentric raised seal rings 40 and 42 are formed on the upper surface of upper element 30. Seal rings 40 and 42 are hollow, forming spaces 49 and 51 respectively. Seal ring 40 is a major seal and seal ring 42 is a minor seal ring. The terms "major" and "minor" refer to the relative size of the rings, the ring with the larger diameter being the "major" ring. Seal rings may be, without limitation, conical, cylindrical, reverse conical, partially conical and partially cylindrical in shape.

Container cup lid 20 further includes a generally planar lower element 32. A pair of concentric raised seal rings 54 and 41 are formed on the upper surface of lower element 32. Rings 40 and 42 are positioned and dimensioned to sealingly engage rings 54 and 41, respectively when upper element 30 and lower element 32 are aligned and pressed together forming, an annular chamber to receive and hold a disc-shaped media 34, which has a central aperture 60 such that it is larger than the outer diameter of seal ring 41 in lower element 32. The space 52 between concentric seal rings 41 and 54 is sized to retain the disc-shaped media 34, The space between rings 41 and 54 will vary and is adjusted to the space needed to contain the disc-shaped media 34. This relationship can be seen with reference to FIG. 2. In the alternative, one or more additional seal rings may be incorporated into the cup lid 20 wherein the additional rings are outside the space defined by the minor and major seal rings illustrated in the Figures. The term "ring" as utilized herein is not limited to circular structures. Ring refers to any shape that will permit the incorporation of a disc-shaped media and provide a seal between the upper and lower elements at the central annular aperture and the outer dimension of the disc-shaped media.

The seals formed by mating rings 40 and 42 with 54 and 41, respectively are resistant to liquids. When upper element 30 and lower element 32 are sealingly engaged. disc-shaped media 34, retained therebetween, is protected from contact with the beverage or other material contained in cup 22 when container cup lid 20 is placed thereover.

Figure 3:
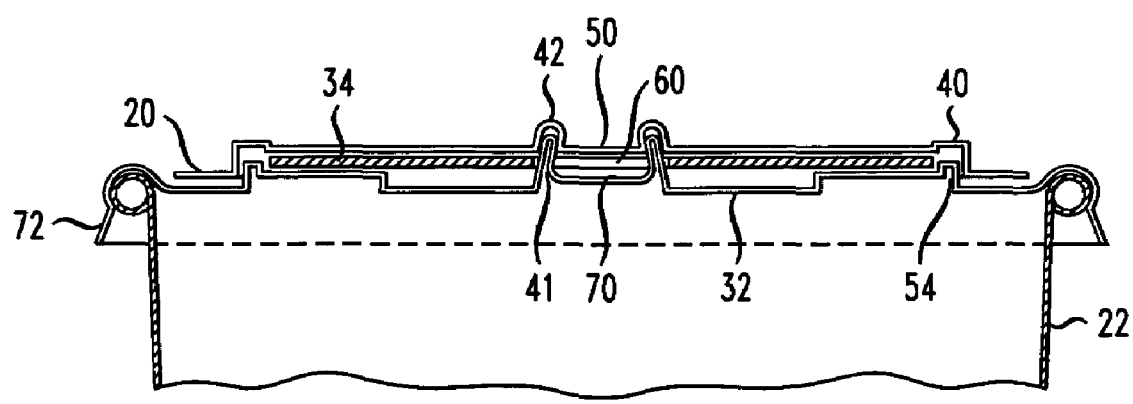
FIG. 3 is a side elevational view of the elements of FIGS. 1 and 2 in assembled relationship.

FIG. 3 illustrates the elements of container cup lid 20 with media disc 34 disposed therein fitted on top of cup 22. Upper element 30 has a descending generally cylindrical or generally conical center portion 50. The lower element 32 is designed to keep the liquid in container cup 22 by sealingly engaging the cup top at the periphery, 72 of lower element 32.

Figure 4:
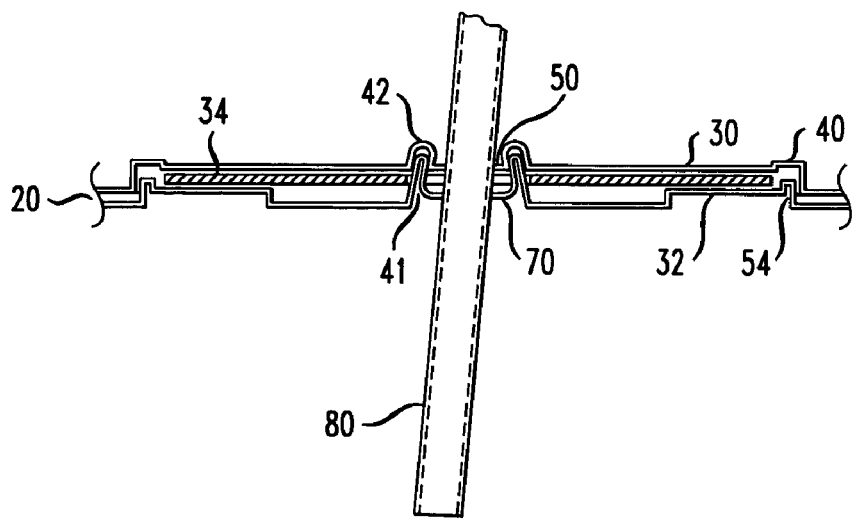
FIG. 4 is a fragmentary side elevational view of the center of the container lid with a straw inserted therethrough.

FIG. 4 illustrates the configuration of container cup lid 20 with a straw 80 inserted through opening 50 in upper element 30, the central aperture 60 of the disc-shaped media 34 and the opening 70 in the lower element 32. The opening 70 in the lower element 32 preferably comprises an X-shaped or similar cuts to facilitate passage of the straw therethrough. Upper element opening 50 preferably has a hole cut into it or, in the alternative, may comprise an X-shaped or similar cuts aligned with similar cuts in opening 70 to facilitate passage of a straw therethrough. It is preferable to use a round opening 50 die-cut in upper element 30 and an X-shaped die-cut opening 70 in lower element 32.

Figure 5:
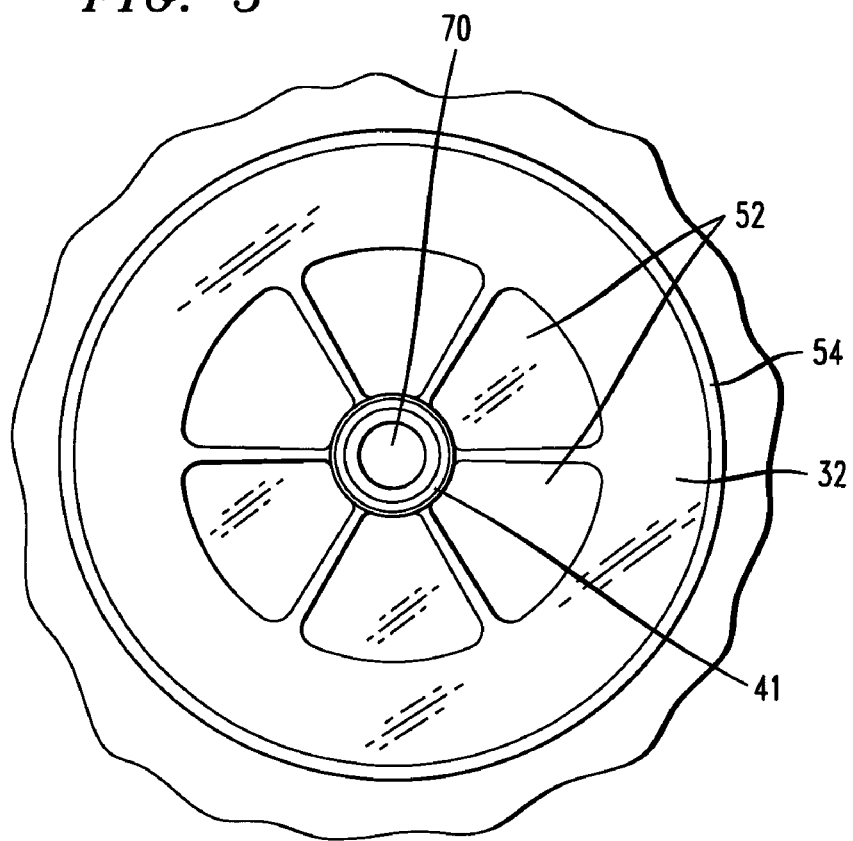
FIG. 5 is a fragmentary, top view of one embodiment of the center of the lower element of the container lid.

FIG. 5 illustrates the central portion of the lower element 32. Surrounding the minor seal ring 41 are a series of indentations 52 in the planar surface of lower element 32 which are separated by un-indented material of lower element 32. Two or more indentations may be formed into lower element 32 with four to eight such indentations being preferred. FIG. 5 illustrates six of said indentations. The result is a spoke-like structure. This spoke-like structure strengthens the plane of element 32. When lid 20 containing this spoke-like structure is assembled, the resulting lid has been stiffened and resists being deformed and pressed into the beverage container 22 when straw 80 is inserted through the lid. When the disc-shaped media 34 is inserted into lid 20, the resulting lid structure is further stiffened and provides even greater resistance to being deformed by insertion of a straw 80.

Upper element 30 and lower element 32 may be constructed by vacuum-forming or injection molding certain well known plastic materials in a manner well known in the art. The thickness of the plastic sheet material from which blanks are formed may range from about 0.005 inches to, in some extreme cases, to about 0.060 inches. In a particular embodiment, when vacuum formed, 12-mil thick polystyrene or other suitable material is preferred. An important feature of container lid 20 is that the container lid won't come apart when handled.

Container cup lid 20 can be assembled using high-speed assembly equipment to combine upper element 30, lower element 32 and disc shaped media disc.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "innier", "outer", "inwardl", "outwardly", "vertical". "horizontal", and the like when used herein, refer to the positions of the respective elements shown on the accompanying drawings figures and the present invention is not necessarily limited to such positions.

Although described primarily with respect to digital media disks, it is also to be understood that the closures of the invention may be formed in different configurations to hold and display many different items, such as game cards, game pieces, toys, coupons, stamps and stickers, scratch-off cards and the like.

It is further to be understood, as part of the invention, that in certain applications of the invention it may be found desirable to permanently join the inner and outer members as by sonic welding or thermal welding, so that the closure must be "broken" in order to gain access to the premium or other item contained between the inner member and the outer member.

What have been described are various exemplary embodiments of closures for use with drink cups. It should be a understood, however, that the examples described herein merely illustrate aspects of the invention and should not be construed as limiting the scope of the invention which may be implemented in any manner consistent with the general principles of the invention described therein.

What is claimed is:

1. A container lid for a cup-type beverage container comprising:
   a disc-shaped media of the type having a central annular aperture therethrough;
   a lid adapted to be releasably affixed to said beverage container, said lid comprising an upper element having a top and a bottom surface and a lower element having a top and a bottom surface, said lower element having a peripheral portion for mounting to said beverage container and having two concentric raised seal rings extending upward from said top surface thereof, each seal ring having an inner and an outer surface with respect to the concentric center of the seal rings, the seal ring having the largest diameter being the major ring and the seal ring having the smallest diameter being the minor ring, said minor ring having an outer diameter smaller than the diameter of said central annular aperture and an opening formed therein for receiving a straw and said major ring having an inside diameter larger than the diameter of said disc-shaped media, the space between the major and minor rings forming a cavity for holding said disc-shaped media,
   said upper element having a minor raised seal ring, said minor seal ring having an internal space sized for receiving and sealingly engaging both the inner and the outer surface of the minor seal ring of the lower element and having an opening formed therein for receiving a straw aligned with said lower element minor ring opening, a major ring having an internal space sized to be sealingly engaged and aligned with said major seal ring of the lower element, and a space between said major and minor seal rings such that, said upper and lower elements define an internal annular chamber when they are sealingly engaged at the surfaces of both rings of each,
   said disc-shaped media being disposed within the annular chamber, wherein said annular chamber is shaped to closely receive the disc-shaped media.

2. The container lid of claim 1, wherein the seal rings are conical.

3. The container lid of claim 1, wherein the seal rings are cylindrical.

4. The container lid of claim 1, wherein the lower element further comprises a series of indentations extending in a radial fashion from the minor seal ring toward the major seal ring.

5. A method for packaging comprising the steps of:
   providing a disc-shaped media of the type having a central annular aperture therethrough;
   providing a cup-type beverage container having an opening therein for receiving a beverage;
   dispensing a beverage within said cup-type beverage container;
   providing a lid comprising an upper element having a top and a bottom surface and a lower element having a top and a bottom surface, said lower element having a peripheral portion for mounting to said beverage container and having two concentric raised seal rings extending upward from said top surface thereof, each seal ring having an inner and an outer surface with respect to the concentric center of the seal rings, the seal ring having the largest diameter being the major ring and the seal ring having the smallest diameter being the minor ring, said minor ring having an outer diameter smaller than the diameter of said central aperture and an opening formed therein for receiving a straw and said major ring having an inside diameter larger than me diameter of said disc shaped media, the space between the major and minor rings forming a cavity for holding said disc-shaped media,
   said upper element having a minor raised seal ring, said minor seal ring having an internal space sized for receiving and sealingly engaging both the inner and the outer surface of the minor seal ring of the lower element and having an opening formed therein for receiving a straw aligned with said lower element minor ring opening, a major ring having an internal space sized to be sealingly engaged and aligned with said major seal ring of the lower element, and a space between said major and minor seal rings such that, said upper and lower elements define an internal annular chamber when they are sealingly engaged at the surfaces of both rings of each,
   inserting said disc-shaped media into said annular chamber and positively retaining it about said lower seal ring;
   sealingly attaching said upper element to said lower element; and affixing said lid to said cup-type beverage container and thereby closing said opening.

6. The method of claim 5, wherein the seal rings are conical.

7. The method of claim 5, wherein the seal rings are cylindrical.

8. The method of claim 5, wherein the lower element further comprises a series of indentations extending in a radial fashion from the minor seal ring toward the major seal ring.

* * * * *